(12) United States Patent
Ohta et al.

(10) Patent No.: US 9,278,595 B2
(45) Date of Patent: Mar. 8, 2016

(54) SUSPENSION ARM MOUNTING STRUCTURE

(71) Applicants: HONDA MOTOR CO., LTD., Minato-Ku, Tokyo (JP); F-TECH INC., Kuki, Saitama (JP)

(72) Inventors: Yasutaka Ohta, Wako (JP); Tetsu Ogawa, Wako (JP); Takuya Yanagida, Wako (JP); Yohei Kenmotsu, Tochigi (JP); Junichi Midorikawa, Tochigi (JP)

(73) Assignees: Honda Motor Co., Ltd., Tokyo (JP); F-Tech Inc., Saitama (JP)

( * ) Notice: Subject to any disclaimer, the term of this patent is extended or adjusted under 35 U.S.C. 154(b) by 0 days.

(21) Appl. No.: 14/367,970

(22) PCT Filed: Dec. 18, 2012

(86) PCT No.: PCT/JP2012/082736
§ 371 (c)(1),
(2) Date: Jun. 23, 2014

(87) PCT Pub. No.: WO2013/094580
PCT Pub. Date: Jun. 27, 2013

(65) Prior Publication Data
US 2014/0361508 A1 Dec. 11, 2014

(30) Foreign Application Priority Data

Dec. 21, 2011 (JP) .................... 2011-280361

(51) Int. Cl.
*B60G 3/04* (2006.01)
*B60G 7/02* (2006.01)
*B60G 7/00* (2006.01)

(52) U.S. Cl.
CPC *B60G 7/02* (2013.01); *B60G 7/001* (2013.01); *B60G 7/005* (2013.01);

(Continued)

(58) Field of Classification Search
CPC ...... B60G 7/001; B60G 7/02; B60G 2204/41; B60G 2206/0122; B60G 2204/112; B60G 2206/8103; B60G 2206/122; B60G 2206/16
USPC .................... 280/124.135, 124.136
See application file for complete search history.

(56) References Cited

U.S. PATENT DOCUMENTS 3,222,049 A  12/1965  Tuczek
5,382,006 A  1/1995  Arnold
(Continued)

FOREIGN PATENT DOCUMENTS

CN  1103145 A  5/1995
JP  S54-062542 U  5/1979
(Continued)

OTHER PUBLICATIONS

Office Action issued Aug. 31, 2015 in corresponding Chinese Patent Application No. 201280063363.9.

*Primary Examiner* — Ruth Ilan
*Assistant Examiner* — Robert A Coker
(74) *Attorney, Agent, or Firm* — Carrier Blackman & Associates, P.C.; Joseph P. Carrier; William D. Blackman

(57) ABSTRACT

A suspension arm mounting structure comprises: an arm body section (14) which is disposed between a wheel and a vehicle body and which is configured from a plate-shaped member; a rubber elastic body (46) which is provided between the arm body section (14) and the vehicle body; and a shaft section (16) which is extended from the arm body section (14) in the front-rear direction of the vehicle, is press-fitted or fitted in the through-hole (48) of the rubber elastic body (46), and has a tube-like shape or a closed cross-sectional shape. The shaft section (16) has a pressing section (52) which causes both end surfaces of the plate-shaped member to face each other and press against each other so that the opposing end surfaces are in contact with each other so as to press against each other.

4 Claims, 9 Drawing Sheets

(52) U.S. Cl.
CPC .... *B60G 2204/1431* (2013.01); *B60G 2204/41* (2013.01); *B60G 2204/416* (2013.01); *B60G 2206/0122* (2013.01); *B60G 2206/122* (2013.01)

(56) References Cited

U.S. PATENT DOCUMENTS

| | | | | |
|---|---|---|---|---|
| 5,601,304 | A * | 2/1997 | Tilly et al. | 280/124.15 |
| 5,662,348 | A * | 9/1997 | Kusama et al. | 280/124.134 |
| 5,662,349 | A * | 9/1997 | Hasshi et al. | 280/124.134 |
| 5,992,867 | A * | 11/1999 | Kato et al. | 280/124.134 |
| 6,745,448 | B2 * | 6/2004 | Kondou et al. | 29/450 |
| 7,575,244 | B2 * | 8/2009 | Howell et al. | 280/124.134 |
| 7,703,783 | B2 * | 4/2010 | Miyawaki | 280/124.134 |
| 2002/0000705 | A1 * | 1/2002 | Tunzini | 280/124.134 |
| 2002/0005621 | A1 * | 1/2002 | Christophliemke et al. | 280/124.134 |
| 2009/0008891 | A1 * | 1/2009 | Jang et al. | 280/124.134 |
| 2010/0153592 | A1 * | 6/2010 | Freimuth et al. | 710/38 |
| 2011/0127743 | A1 * | 6/2011 | Musha | 280/124.1 |

FOREIGN PATENT DOCUMENTS

| | | |
|---|---|---|
| JP | H09-155446 A | 6/1997 |
| JP | 2001-212620 A | 8/2001 |
| JP | 2005-052853 A | 3/2005 |
| JP | 2010-047041 A | 3/2010 |
| JP | 2010-195317 A | 9/2010 |
| JP | 2011-162187 A | 8/2011 |

* cited by examiner

FIG.5
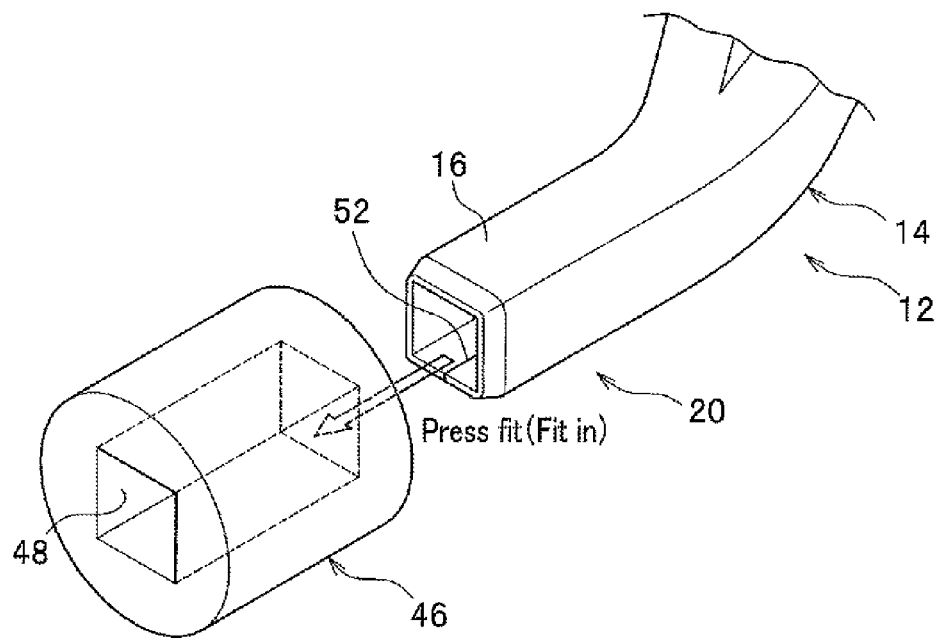
FIG.6A
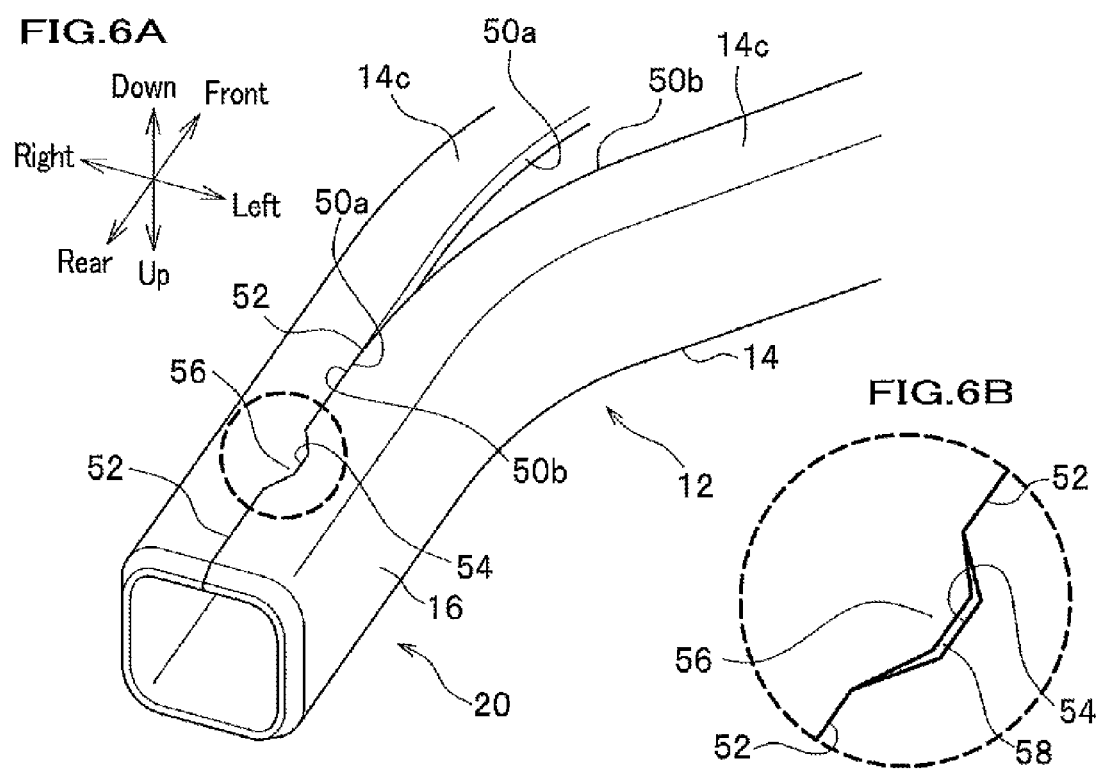
FIG.6B

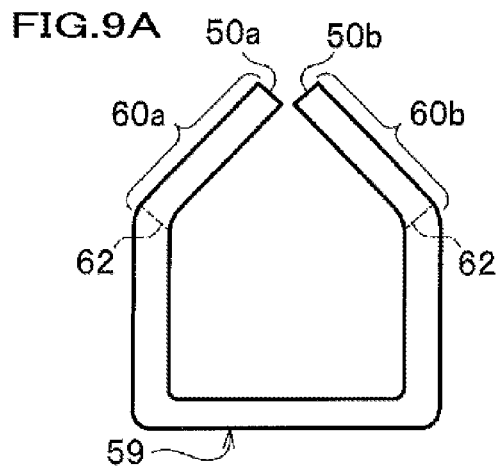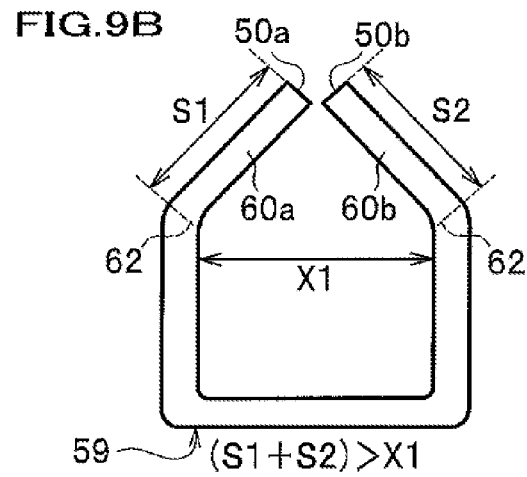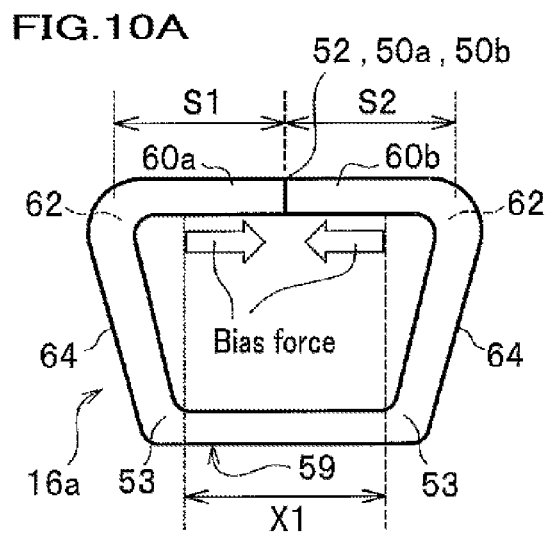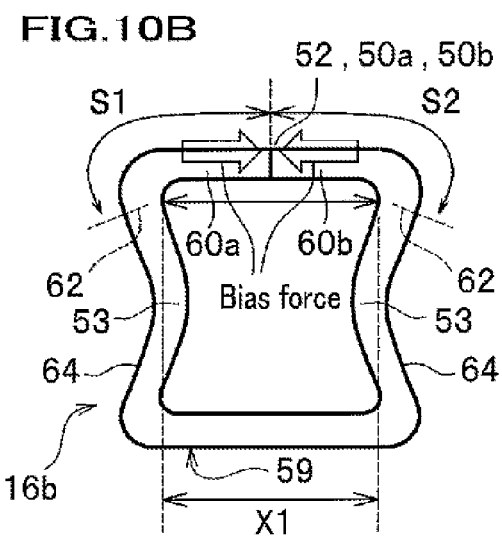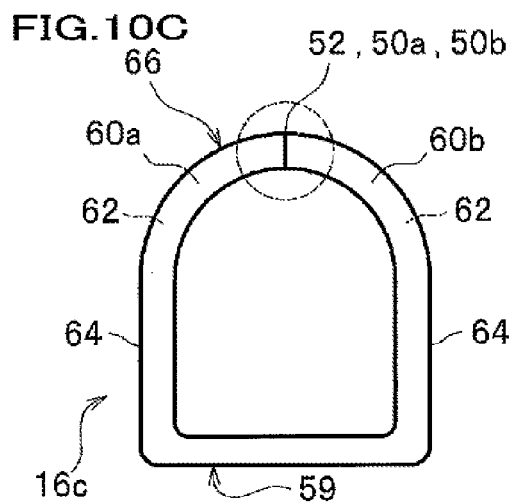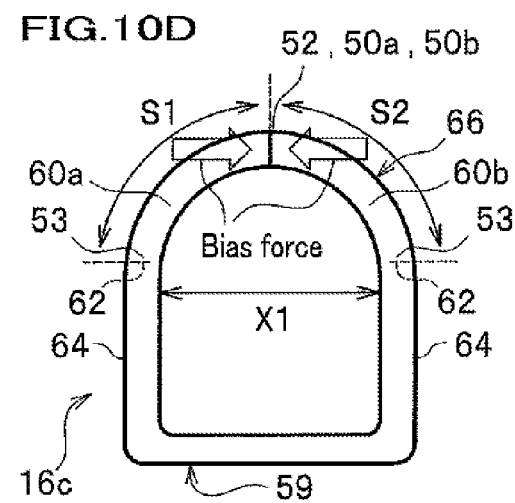

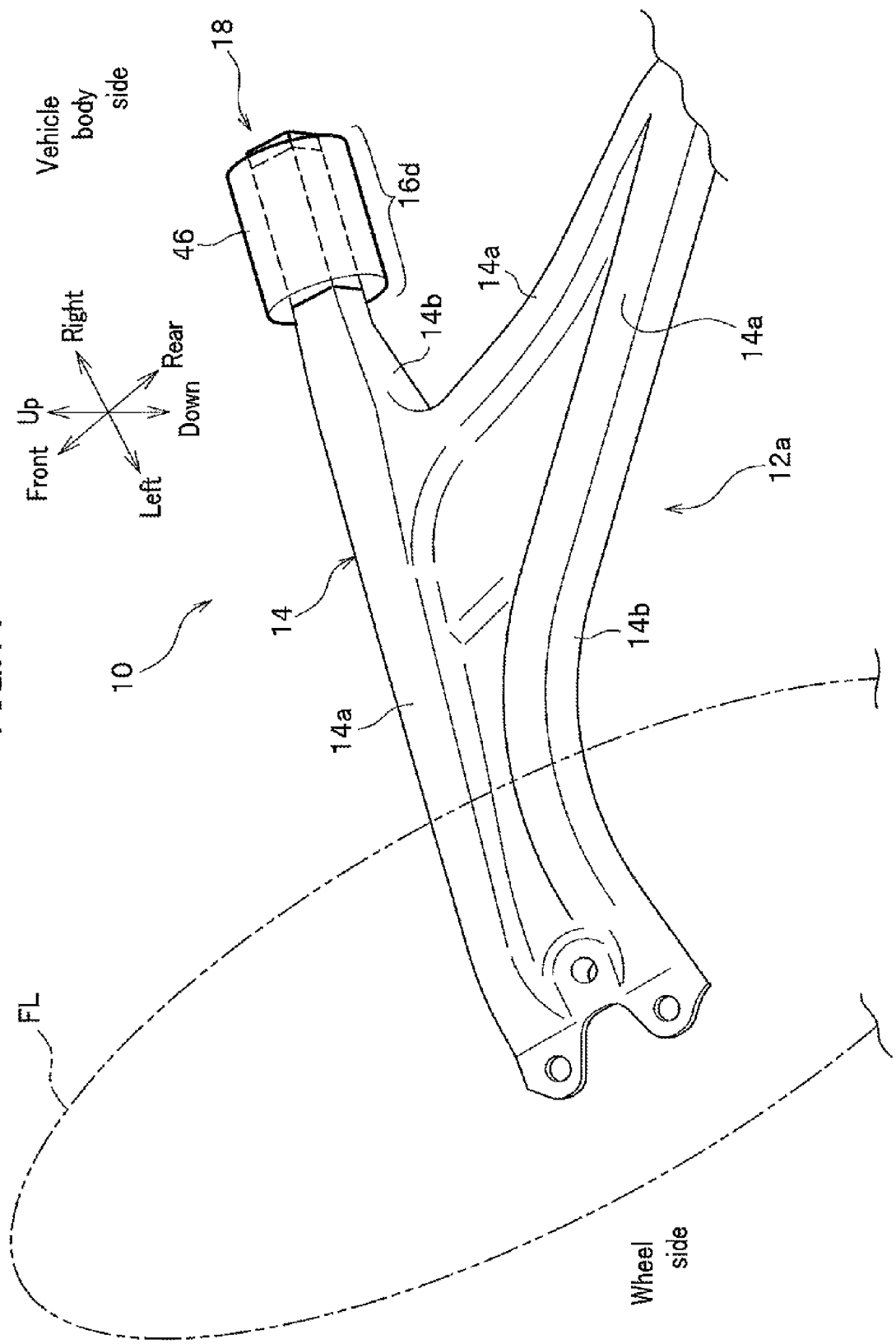

SUSPENSION ARM MOUNTING STRUCTURE

TECHNICAL FIELD

The present invention relates to a suspension arm mounting structure for mounting a suspension arm which swingably supports a wheel side of a vehicle from a vehicle body side.

BACKGROUND ART

Conventionally, suspension arms which connect the vehicle body side and the wheel side through a bush are used in the vehicle suspension. As a structure of such a type of suspension arms, for example, Patent Literature 1 discloses a control arm 1 constituted by a main body 2 and a plurality of support portions 3 as illustrated in FIG. 12A. In the disclosed control arm 1, one of the plurality of support portions is a bearing journal 4 which is formed integrally with the main body 2 by bending a metal plate.

The bearing journal 4 is formed to have an approximately cylindrical shape by arranging a transition portion 5 between the main body 2 and the bearing journal 4, where the transition portion 5 extends from the main body 2 (which has an approximately U-shaped cross section) and has a funnel-like shape with the diameter gradually decreasing toward the bearing journal 4.

CITATION LIST PATENT LITERATURE

Patent Literature 1: Japanese Patent Laid-Open No. 2011-162187

SUMMARY OF INVENTION

Technical Problem

However, in the structure of the control arm 1 disclosed in Patent Literature 1, a gap A is arranged between mutually opposing edge faces 7 of leg portions 6 of the bearing journal 4 as illustrated in FIG. 12B. Therefore, when forces in the back-and-forth direction of the vehicle or forces in the width direction of the vehicle (i.e., a lateral force) which are transferred from the wheel are applied to the control arm 1, the mutually opposing leg portions 6 can move in opposite directions, or bend and deform in such directions that the edge faces 7 of the leg portions 6 come into contact.

As a result, in the case where an elastic element such as a bush is press fitted into the bearing journal 4 (having the approximately cylindrical shape) in the structure of the control arm 1 disclosed in Patent Literature 1, because of deformation of the bearing journal 4 caused by the gap A, it is difficult to stably maintain the press-fitted condition of the elastic element.

In addition, Patent Literature 1 discloses that the rigidity of the bearing journal 4 is increased in the case where the edge faces 7 of the leg portions 6 in the structure of the control arm 1 disclosed in Patent Literature 1 are bonded by adhesion or welding. Nevertheless, in this case, the operation for bonding by adhesion or welding is added to the operation of bending for forming the bearing journal 4. Therefore, the manufacturing efficiency can be lowered by the increase in the manufacturing steps.

Further, Patent Literature 1 discloses that a bearing member 8 having a cylindrical shape (as illustrated in FIG. 12C) is arranged inside the bearing journal 4 in the structure of the control arm 1 disclosed in Patent Literature 1 in order to increase the rigidity of the bearing journal 4. Nevertheless, the arrangement of the bearing member 8 increases the total weight of the suspension arm as well as the manufacturing cost.

A general object of the present invention is to provide a suspension arm mounting structure which can achieve weight reduction as well as reduction of the manufacturing cost by simplification of the manufacturing process. A main object of the present invention is to provide a suspension arm mounting structure which can secure predetermined rigidity and strength.

Solution to Problem

In order to achieve the above objects, according to the present invention, a suspension arm mounting structure for mounting a suspension arm which swingably supports a wheel side of a vehicle from a side of a vehicle body is provided. The suspension arm mounting structure includes: an arm body arranged between the wheel side and the vehicle body side and formed of a plate-like member; an elastic member arranged between the arm body and the side of the vehicle body; and a shaft portion which extends from the arm body toward a front-rear direction of the vehicle or a vehicle width direction, has a tubular shape or a closed cross section, and is fitted or press fitted into an inner circumference of the elastic member. The suspension arm mounting structure is characterized in that the shaft portion includes a biased portion in which opposite edges of the plate-like member are mutually opposed and biased such that the opposite edges abut and press each other.

According to the present invention, the biased portion is provided, and the opposite edges of the plate-like member, of which the shaft portion having a tubular shape or a closed cross section is formed, are caused be biased to abut and press each other. Therefore, for example, the operations for adhesion or welding between the opposite edges can be dispensed with, so that the rigidity of the shaft portion can be increased. In addition, since the opposite edges are butted and are mutually biased, it is possible to suppress slippage of the abutting portions of the opposite edges when the shaft portion receives a force from the wheel. Further, the arrangement of the cylindrical bearing member inside the bearing journal as in the conventional technique becomes unnecessary, so that it is possible to achieve weight reduction while securing predetermined rigidity and strength.

Resultantly, according to the present invention, it is possible to simplify the manufacturing process, reduce the manufacturing cost, and achieve weight reduction. Further, according to the present invention, the predetermined rigidity and strength can be achieved, and the various conditions including the manufacturing cost, the weight reduction, the process simplification, and the rigidity and strength can be concurrently achieved in harmony with each other.

An additional feature of the suspension arm mounting structure according to the present invention is that the arm body includes, a horizontal portion which extends in an approximately horizontal direction when the arm body is mounted on the vehicle body, vertical portions formed by bending edge portions of the horizontal portion downward, and reverse flange portions formed by bending lower edge portions of the vertical portions inward, and the opposite edges of a portion of the plate-like member of which the shaft portion is formed are constituted by opposing edges of the reverse flange portions.

According to the above feature, the shaft portion is formed by use of the reverse flange portions, which contribute to improvement of the rigidity of the arm body. Therefore, it is possible to continuously form closed cross sections in the portion between the arm body and the shaft portion, and secure the rigidity (in the transition portion) between the arm body and the shaft portion.

A further additional feature of the suspension arm mounting structure according to the present invention is that the reverse flange portions have mutually opposing edges, and the edges of the reverse flange portions gradually come closer to each other with approach to the shaft portion from the arm body, and abut and bias each other in the shaft portion.

According to the above feature, the edges of the reverse flange portions gradually come closer to each other with approach to the shaft portion from the arm body, and the edges abut and bias each other in the shaft portion. Therefore, it is possible to avoid occurrence of intense stress concentration between the arm body and the shaft portion, and improve the rigidity and strength.

Another additional feature of the suspension arm mounting structure according to the present invention is that a recessed portion is formed in one of the opposite edges of the plate-like member which are opposed and butted, and a protruding portion is formed in the other of the opposite edges of the plate-like member, the recessed portion and the protruding portion are fitted to each other, and a clearance is arranged between the recessed portion and the protruding portion.

According to the above feature, the clearance is arranged between the recessed portion and the protruding portion in the arrangement in which the opposite edges of the plate-like member are butted, and the recessed portion and the protruding portion are fitted to each other through the clearance. Therefore, when the plate-like member is bent to butt the opposite edges, for example, it is possible to suppress occurrence of a non-abutting state of the opposite edges of the portion of the plate-like member of which the shaft portion is formed. In addition, it is possible to improve the accuracy in forming the shaft portion. Such a non-abutting state occurs, for example, when a dimensional error (a manufacturing tolerance) or the like causes a situation in which the protrusion in the protruding portion exceeds a predetermined amount or the recession in the recessed portion is small. Moreover, according to the present invention, the recessed portion and the protruding portion are fitted to each other. Therefore, it is possible to prevent slippage of the opposite edges in the axial direction with high reliability when a force is transferred from the wheel.

Advantageous Effect of Invention

According to the present invention, it is possible to provide a suspension arm mounting structure which can reduce the manufacturing cost by simplification of the manufacturing process, achieve weight reduction, and secure predetermined rigidity and strength.

BRIEF DESCRIPTION OF DRAWINGS

FIG. 5 is a perspective view illustrating a situation in which the shaft portion is fitted or press fitted into the rubber elastic element.

FIG. 6A is a perspective view of a biased portion which is formed by bending a plate-like member to butt opposite edge faces of the plate-like member, and FIG. 6B is a partially magnified perspective view indicating a clearance between a protruding portion formed in one of the edge faces and a recessed portion formed in the other of the edge faces in a situation in which the protruding portion is fitted in the recessed portion.

FIGS. 9A and 9B are schematic diagrams illustrating a necessary condition for forming the biased portion in the shaft portion by using flange portions arranged by bending the plate-like member.

FIG. 10A is a schematic diagram illustrating a shaft portion having an approximately trapezoidal, closed cross section, FIG. 10B is a schematic diagram illustrating a shaft portion having a closed cross section and an approximately constant lateral width in the upper and lower sides, and FIG. 10C and 10D are schematic diagrams illustrating a shaft portion which has a closed cross section and partially includes curved portions.

FIG. 11 is a partial perspective view of a lower arm according to another embodiment of the present invention.

DESCRIPTION OF EMBODIMENTS

Figure 1:
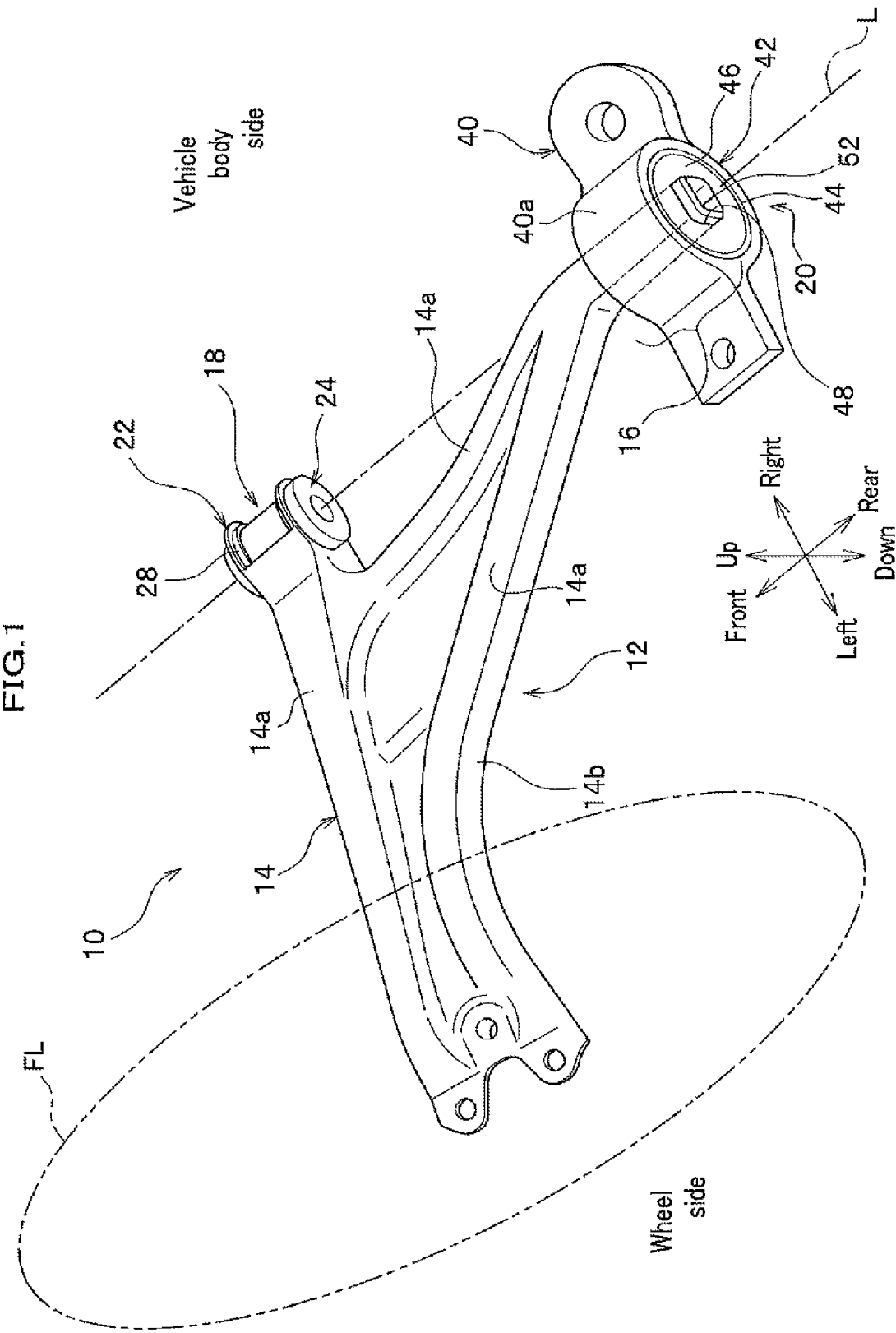
FIG. 1 is a perspective view of a lower arm to which a suspension arm mounting structure according to an embodiment of the present invention is applied.
Figure 2:
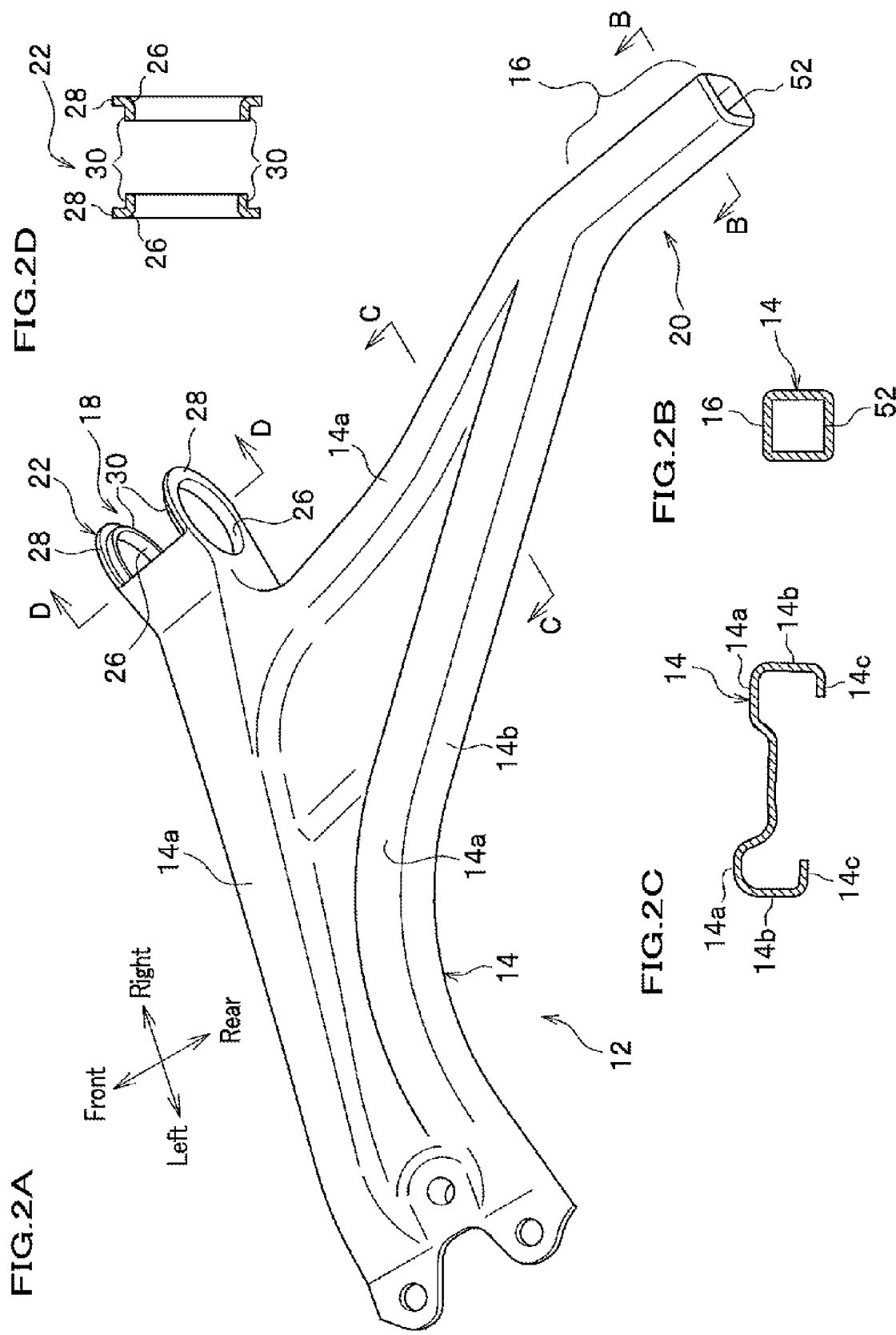
FIG. 2A is a perspective view of an arm body constituting the lower arm of FIG. 1.
FIG. 2B is a vertical cross-sectional view at the B-B cross section indicated in the FIG. 2A.
FIG. 2C is a vertical cross-sectional view at the C-C cross section indicated in FIG. 2A.
FIG. 2D is a vertical cross-sectional view at the D-D cross section indicated in FIG. 2A.
Figure 3:
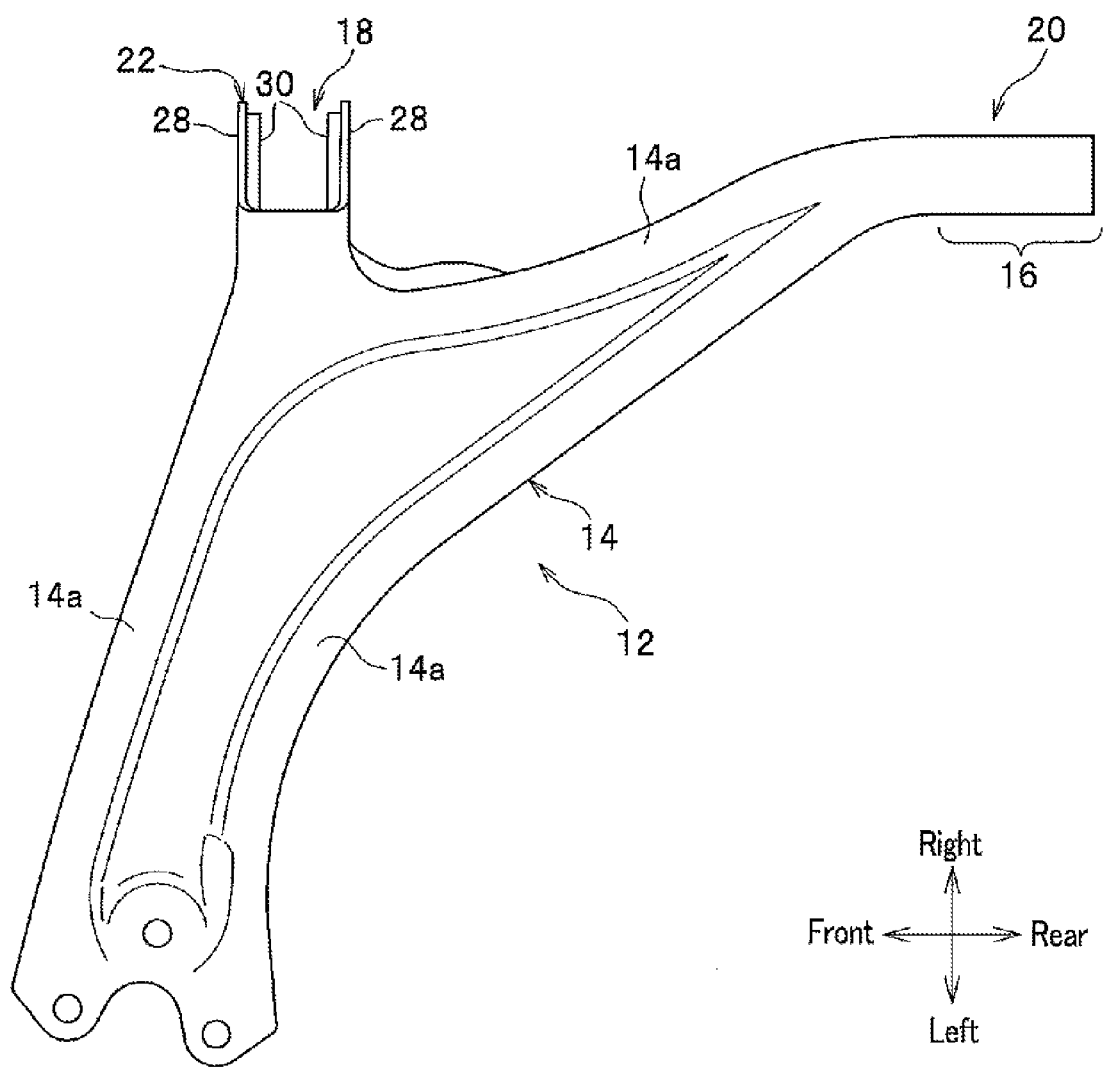
FIG. 3 is a plan view of the arm body indicated in FIG. 2A.

Hereinbelow, the embodiments of the present invention are explained in detail below with reference to drawings when necessary. FIG. 1 is a perspective view of a lower arm to which a suspension arm mounting structure according to an embodiment of the present invention is applied. FIG. 2A is a perspective view of an arm body constituting the lower arm of FIG. 1, FIG. 2B is a vertical cross-sectional view at the B-B cross section indicated in FIG. 2A, FIG. 2C is a vertical cross-sectional view at the C-C cross section indicated in FIG. 2A, and FIG. 2D is a vertical cross-sectional view at the D-D cross section indicated in FIG. 2A. FIG. 3 is a plan view of the arm body indicated in FIG. 2A. In each drawing, "Front" and "Back" indicate the front and rear directions of the vehicle, "Up" and "Down" indicate the up and down (vertical) directions, and "Left" and "Right" indicate the left and right directions (vehicle width directions).

The suspension 10 swingably supports the wheel side of the vehicle from the vehicle body side, and includes a lower arm 12, which is formed in an approximately L shape in a plan view and has a function of a suspension arm. The lower arm 12 having the approximately L shape is merely an example of the lower arm, and the lower arm is not limited to the example. For example, the present invention can be applied to a lower arm having another shape such as an approximately A shape.

As illustrated in FIG. 1, the lower arm 12 is arranged between the wheel side and the vehicle body side, and includes an arm body 14, which is formed by bending a single plate-like member 59. (As for the plate-like member 59, see FIGS. 7A and 7B to FIGS. 10A to 10D.) In addition, a shaft portion 16 having the shape of a square tube and an axis in the front-rear direction of the vehicle is arranged at a rear end, in the front-rear direction, of the arm body 14. The shaft portion 16 also has a function of a shaft portion extending in the front-rear direction of the vehicle and having an approximately rectangular, closed vertical cross section (as illustrated in FIG. 2B).

Although the vertical cross section perpendicular to the axial direction of the shaft portion 16 has the rectangular shape as illustrated in FIG. 2B in the above example, the shape of the vertical cross section is not limited to the above example. For example, the vertical cross section may have a polygonal shape having multiple corners.

As illustrated in FIG. 1 and FIG. 2B, the arm body 14 includes horizontal portions 14a, vertical portions 14b, and reverse flange portions 14c. When the arm body 14 is mounted on the vehicle body, the horizontal portions 14a are located on the upper sides of the arm body 14 and include a plurality of flat faces extending in approximately horizontal directions. The vertical portions 14b are formed by bending edge portions of the horizontal portions 14a downward. The reverse flange portions 14c are formed by bending lower edge portions of the vertical portions 14b inward. As explained later, the opposite edge faces 50a and 50b of a portion of the plate-like member 59 of which the shaft portion 16 is formed are constituted by the edge faces (edge portions) of the reverse flange portions 14c. The provision of the reverse flange portions 14c as above enables securement of desired rigidity of the arm body 14, which has an open cross section.

In addition, as illustrated in FIG. 2A and FIG. 3, a front attachment portion 18 and a rear attachment portion 20 are integrally arranged in the arm body 14. The front attachment portion 18 is to be attached to the vehicle body on the front side of the vehicle, and the rear attachment portion 20 is to be attached to the vehicle body on the rear side of the front attachment portion 18. In the present embodiment, an exemplary case in which the shaft portion 16 is arranged in the rear attachment portion 20 is illustrated.

In FIG. 1, a situation in which the lower arm 12 arranged between the left front wheel FL (not shown) of the vehicle and the vehicle body (not shown) is schematically illustrated. In FIG. 1, the axial line L connecting the front attachment portion 18 and the rear attachment portion 20 is indicated by the single-dot chain line, and the lower arm 12 is supported in such a manner that the lower arm 12 can swing around the vehicle body on the axial line L as the swing center (swing axis).

An outer-circumference support portion 22 is arranged in the front attachment portion 18, and extends from the right edge, in the vehicle width direction, of the arm body 14 toward the vehicle body side. In addition, a front bush 24 is fitted into the outer-circumference support portion 22, and supports a shaft (not shown) which is fixed to the vehicle body side.

As illustrated in FIG. 2D, a pair of bearing pieces 28 is arranged in the outer-circumference support portion 22. Each of bearing pieces 28 branches off from the arm body 14 to face each other, and have mutually opposing bearing holes 26, which are through-holes having approximately round shapes. In addition, annular flange portions 30 are arranged in the pair of bearing pieces 28. Each of the annular flange portions 30 protrudes from the peripheral portion of the corresponding one of the mutually opposing bearing holes 26 toward the opposite one of the bearing holes 26. The annular flange portions 30 are formed, for example, by burring which is known.

Figure 4:
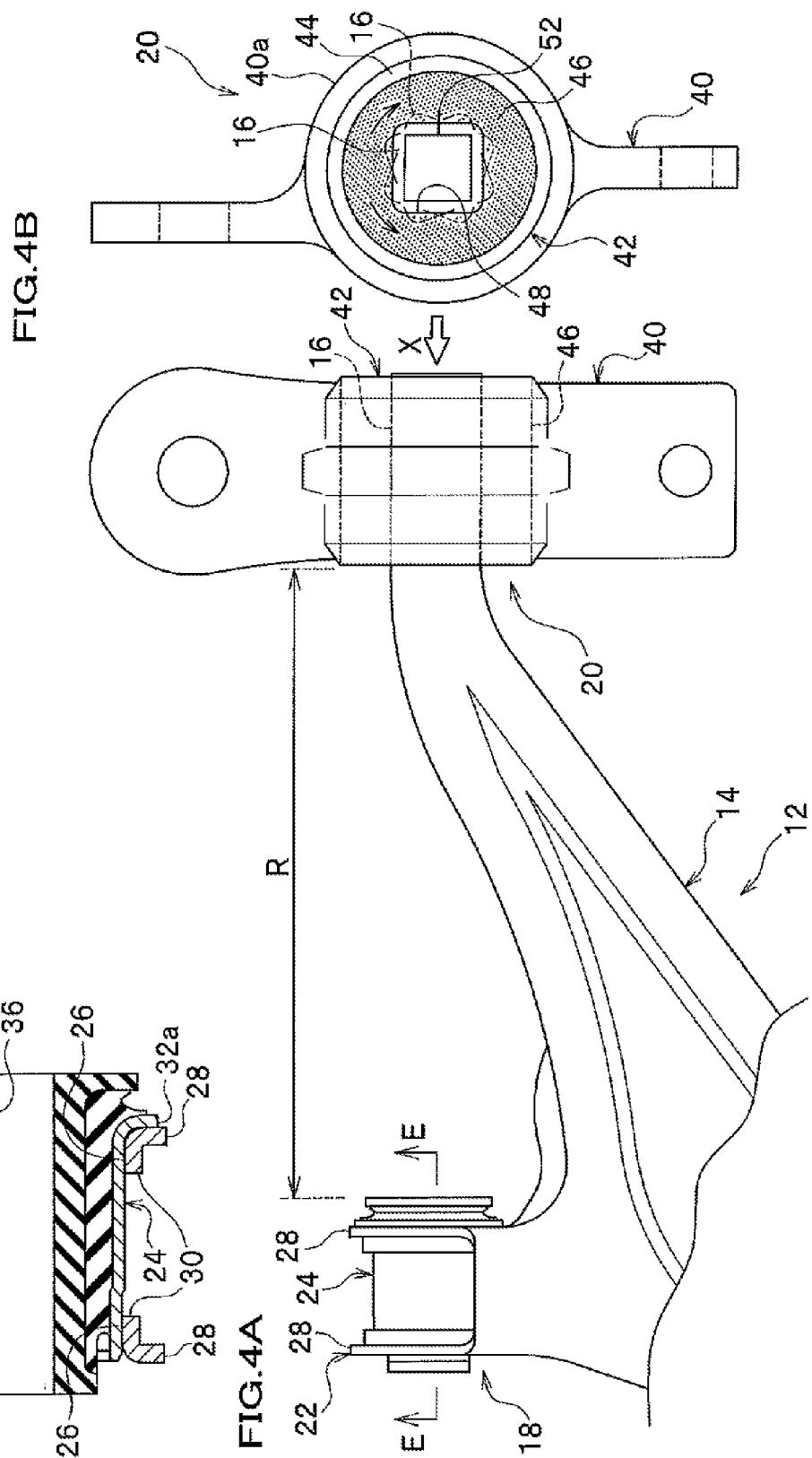
FIG. 4A is a partially magnified plan view illustrating a front bush and a rear bush which are arranged in the arm body along the front-rear direction of the vehicle.
FIG. 4B is a view of the rear bush from the arrow X indicated in FIG. 4A.
FIG. 4C is a vertical cross-sectional view at the E-E cross section indicated in FIG. 4A.

FIG. 4A is a partially magnified plan view illustrating the front bush and a rear bush which are arranged in the arm body along the front-rear direction of the vehicle, FIG. 4B is a view of the rear bush from the direction of the arrow X indicated in FIG. 4A, and FIG. 4C is a vertical cross-sectional view at the E-E cross section indicated in FIG. 4A.

As illustrated in FIG. 4C, the front bush 24 includes an outer tube 32, a holding member 34, and a rubber elastic element 38. The outer tube 32 is formed of metal, and inserted inside the bearing holes 26 of the pair of bearing pieces 28 to be held. The holding member 34 is inserted inside the outer tube 32. The rubber elastic element 38 has an approximately cylindrical shape, and includes a through-hole 36 which supports the shaft when the shaft (not shown) fixed to the vehicle body side is press fitted into the through-hole 36. In addition, a diameter-increased portion 32a is arranged at an end of the outer tube 32 in the axis direction, and functions as a stopper when the front bush 24 is press fitted into the bearing holes 26.

As illustrated in FIGS. 4A and 4B, the rear bush 42 is arranged in the rear attachment portion 20 through a bracket 40, which is attached and fixed to the vehicle body side. An outer tube 44 and a rubber elastic element 46 are arranged in the rear bush 42. The outer tube 44 is formed of metal and fixed to or press fitted into a cylindrical portion 40a in the bracket 40. The rubber elastic element 46 has an approximately cylindrical shape with an axis in the front-rear direction of the vehicle, and is held in the outer tube 44. The rubber elastic element 46 functions as "the elastic member arranged between the arm body and the vehicle body side".

FIG. 5 is a perspective view illustrating a situation in which the shaft portion is fitted or press fitted into the rubber elastic element, FIG. 6A is a perspective view of a biased portion which is formed by bending the plate-like member to butt the edge faces of the plate-like member, and FIG. 6B is a partially magnified perspective view indicating a clearance between a protruding portion formed in one of the edge faces and a recessed portion formed in the other of the edge faces in the situation in which the protruding portion is fitted in the recessed portion.

As illustrated in FIG. 5, a through-hole 48 penetrating through the rubber elastic element 46 in the axial direction and having an approximately rectangular shape in side view is formed inside the rubber elastic element 46. In this case, the vertical cross section perpendicular to the axial direction of the through-hole 48 is formed in a shape corresponding to the polygonal shape of the shaft portion 16, which is arranged at the rear end of the arm body 14 and has the aforementioned polygonal shape with the multiple corners. The shaft portion 16 is fitted or press fitted into the through-hole 48 (which is formed in the rubber elastic element 46 and has the approximately rectangular shape).

As illustrated in FIG. 6A, a biased portion 52 is arranged in the shaft portion 16 by bending the single plate-like member forming the arm body 14 so as to make the opposite edge faces 50a and 50b of the single plate-like member abut each other, and press each other. The biased portion 52 is arranged in the vertically lower one (in the vertical direction of the vehicle) of the four sides of the shaft portion 16 which are formed to realize the rectangular cross section. The manner for manufacturing the biased portion 52 will be explained later.

In addition, a recessed portion 54, which is recessed in the right-left direction (the vehicle width direction), is arranged the edge face 50a of the plate-like member forming the biased portion 52. In addition, a protruding portion 56, which protrudes in correspondence with the shape of the recession in the 54, is arranged in the other edge face 50b, abutting the edge face 50a, of the plate-like member forming the biased portion 52. When the opposite edge faces 50a and 50b are butted by bending, the recessed portion 54 and the protruding portion 56 are fitted to each other, so that the edge face 50a and the other edge face 50b of the plate-like member can be precisely positioned in formation of the biased portion 52.

Further, as explained later, since the recessed portion 54 and the protruding portion 56 are fitted to each other, when a force in the axial direction is applied to the shaft portion 16, it is possible to prevent movement, out of alignment in the axial direction, of the opposite edge faces 50a and 50b which are butted, and improve the rigidity and strength of the shaft portion 16.

Furthermore, as explained later, a clearance 58 is arranged between the recessed portion 54 and the protruding portion 56 in the situation in which the opposite edge faces 50a and 50b are butted and the recessed portion 54 and the protruding portion 56 are fitted to each other. (See FIG. 6B.) Because of the provision of the clearance 58, it is possible to prevent the opposite edge faces 50a and 50b from being brought into a noncontact state, which can be caused by a dimensional error or the like.

Moreover, as explained later, the lower arm 12 is formed in such a manner that the edge faces 50a and 50b of the mutually opposing reverse flange portions 14c gradually come closer to each other with approach to the shaft portion 16 from the arm body 14, and the edge faces 50a and 50b abut and bias each other in the shaft portion 16. (See the part (a) of FIG. 6.)

The lower arm 12 to which the suspension arm mounting structure according to the present embodiment is applied is basically formed as explained above. Next, the operational effects of the present embodiment are explained below.

First, a method for manufacturing the biased portion 52 arranged in the shaft portion 16 of the lower arm 12 is explained in detail below.

The biased portion 52 can be arranged in the shaft portion 16 by applying pressurizing forces to the single plate-like member by use of a pressurizing means (not shown) and using the springback which occurs when the rear end portion, in the front-rear direction of the vehicle, of the arm body 14 is bent. The springback is a phenomenon in which a material is bent, for example, by using a jig (or a tool) or the like and then the jig (or the tool) is removed from the material, the deformation of the material slightly returns toward the original state.

Figure 7A:
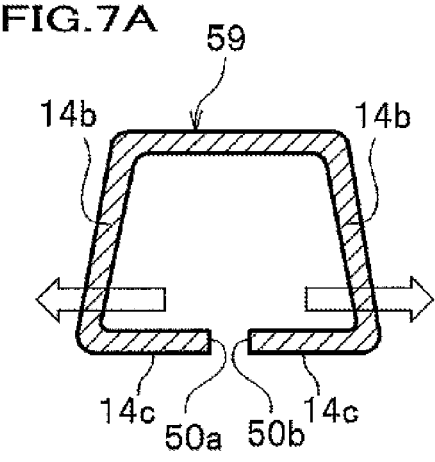
FIGS. 7A and 7B are schematic diagrams illustrating a first example of formation of the biased portion.
Figure 7B:
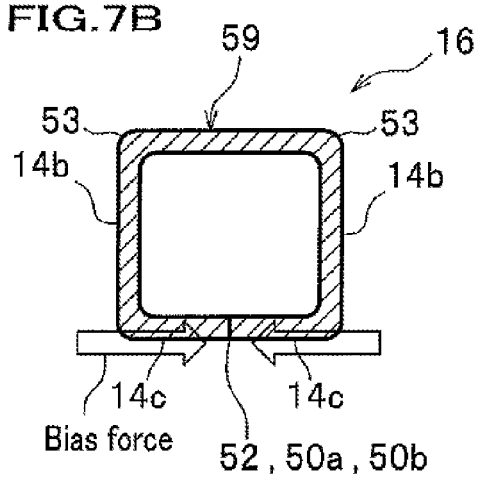

A concrete example of formation of the biased portion 52 is explained below. FIGS. 7A and 7B are schematic diagrams illustrating the first example of formation of the biased portion. After the plate-like member 59 is formed to have an approximately rectangular cross section by bending the plate-like member 59, pressurizing forces in outward directions (the directions indicated by the arrows), in which the mutually opposing vertical portions 14b get away from each other, are applied by jigs or the like to lower portions of the vertical portions 14b so as to deform the vertical portions 14b and widen the gap between the opposing edge faces of the plate-like member 59, as illustrated in FIG. 7A. Subsequently, the application of the pressurizing forces to the lower portions of the vertical portions 14b is removed by removing the jigs from the arrangement illustrated in FIG. 7A, so that bias forces which bias the vertical portions 14b in the directions (indicated by the arrows) of closing the gap between the opposite edge faces 50a and 50b are generated by springback, and thus the biased portion 52 is formed. The bias-force generation portions 53 are arranged at the root portions of the mutually opposing vertical portions 14b (which are located on the upper portions of the vertical portions 14b). In the bias-force generation portion 53, the bias forces for the biased portion 52 are generated so as to cause the opposite edge faces 50a and 50b press each other.

Figure 8A:
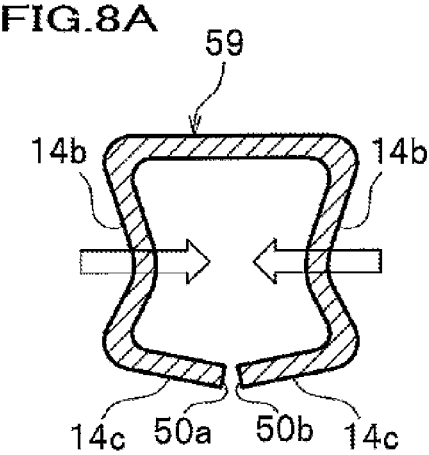
FIGS. 8A and 8B are schematic diagrams illustrating a second example of formation of the biased portion.
Figure 8B:
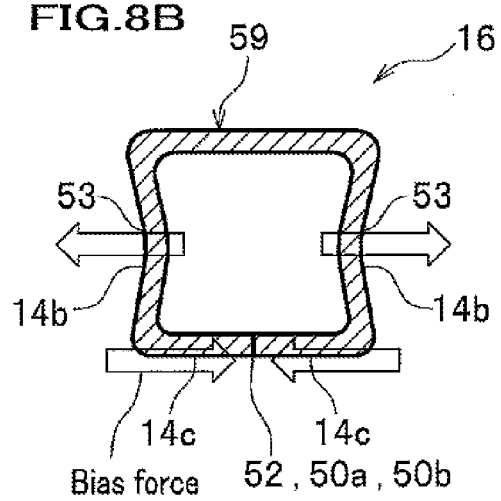

FIGS. 8A and 8B are schematic diagrams illustrating the second example of formation of the biased portion. After the plate-like member 59 is formed to have an approximately rectangular cross section by bending the plate-like member 59, approximately central portions of the mutually opposing vertical portions 14b are pressed by jigs or the like toward inside (in the directions indicated by the arrows) such that the vertical portions 14b are deformed and bent toward inside, where the approximately central portions of the vertical portions 14b are base points in bending of the vertical portions 14b. Subsequently, the application of the pressurizing forces to the approximately central portions of the vertical portions 14b is removed by removing the jigs from the arrangement illustrated in FIG. 8A, so that bias forces which bias the vertical portions 14b in the directions (indicated by the arrows) of closing the gap between the opposite edge faces 50a and 50b are generated by springback, and thus the biased portion 52 is formed. The bias-force generation portions 53 are arranged at the approximately central portions of the mutually opposing vertical portions 14b. In the bias-force generation portion 53, the bias forces for the biased portion 52 are generated to cause the opposite edge faces 50a and 50b press each other. In the first and second concrete examples, the plate-like member 59 is deformed by applying the lateral pushing forces (in the directions indicated by the arrows) to the plate-like member 59. However, the manner of forming the biased portion 52 is not limited to the above examples. For example, the biased portion 52 as illustrated in FIG. 7B or 8 can be formed by deforming the plate-like member 59 by application of pushing forces in the vertical directions (the directions perpendicular to the arrows) to the plate-like member 59. Similarly, the manner of forming the biased portion 52 is not limited even in the concrete examples explained below.

Next, another concrete example is explained below. In the following example, mutually opposing flange portions 60a and 60b are arranged by bending the plate-like member 59 (by press working), and the biased portion 52 is formed by using the flange portions 60a and 60b.

FIGS. 9A and 9B are schematic diagrams illustrating a necessary condition for forming the biased portion in the shaft portion by using the flange portions arranged by bending the plate-like member. When the shaft portion 16 having a closed cross section is formed by bending the plate-like member 59, for example, the flange portions 60a and 60b which are inclined and are mutually opposed are formed by bending root portions 62 of the plate-like member 59 to a predetermined angle as illustrated in FIG. 9A. In this case, the sum $(S1+S2)$ of the lengths of the two flange portions 60a and 60b is set greater than the lateral width X1 between the root portions 62 of the flange portions 60a and 60b, i.e., $S1+S2 > X1$, where the lengths from the root portions 62 of the plate-like member 59 to the opposite edge faces 50a and 50b in the plate-like member 59 are the lengths S1 and S2 of the flange portions 60a and 60b, respectively. Further, the lengths S1 and S2 of the flange portions 60a and 60b may satisfy the relationship, $S1=S2$ or $S1-S2$.

When the plate-like member 59 is formed to satisfy the above necessary condition, $S1+S2 > X1$, and is further formed by bending the flange portions 60a and 60b such that the opposite edge faces 50a and 50b of the plate-like member 59 are butted, shaft portions 16a to 16c respectively having various types of cross sections as explained below can be formed.

FIG. 10A is a schematic diagram illustrating a shaft portion having an approximately trapezoidal, closed cross section, FIG. 10B is a schematic diagram illustrating a shaft portion having a closed cross section and an approximately constant lateral width in the upper and lower sides, and FIGS. 10C and 10D are schematic diagrams illustrating a shaft portion which has a closed cross section and partially includes curved portions.

Bias-force generation portions 53 and a biased portion 52 are arranged in the shaft portion 16a having an approximately trapezoidal, closed cross section as illustrated in FIG. 10A. The bias-force generation portions 53 are arranged on the lower-end sides of mutually opposing side portions 64. In the biased portion 52, the opposite edge faces 50a and 50b are pressed by each other with bias forces generated by the bias-force generation portions 53. On the other hand, in the shaft portion 16b having an approximately rectangular, closed cross section as illustrated in FIG. 10B, bias-force generation portions 53 are arranged in approximately central portions of mutually opposing side portions 64.

Further, the shaft portion 16c having a closed cross section and partially including curved portions 66 as illustrated in FIG. 10C is formed in such a manner that the opposite edge faces 50a and 50b (which are butted) are in face contact with each other. As illustrated in FIG. 10B, bias-force generation portions 53 are arranged at the root portions 62, each of which is at a border between one of mutually opposing side portions 64 and one of the curved portions 66. The curved portions 66 are arranged above the side portions 64, and may have an approximately semicircular shape.

Next, a method for mounting the lower arm 12 is explained below. First, the shaft portion 16, which extends from the arm body 14 in the front-rear direction of the vehicle, is formed by the bending as explained above. That is, the shaft portion 16 has a tubular shape or a closed cross section. Subsequently, the front bush 24, which is arranged between the arm body 14 and the vehicle body side and has an axis in the front-rear direction of the vehicle, is fitted in the bearing holes 26 of the pair of bearing pieces 28, which are arranged on the arm body 14.

Further, the shaft portion 16 is fitted or press fitted into the through-hole 48 having a rectangular cross section in the rubber elastic element 46 in the rear bush 42, which is arranged between the arm body 14 and the vehicle body side and has an axis in the front-rear direction of the vehicle. (See FIG. 5.) In this case, the rear bush 42 can be easily positioned by using the distance R from the edge face of the front bush 24 (the rubber elastic element 38), which is indicated in FIG. 4A. Alternatively, the rear bush 42 may be fitted in in advance of the front bush 24.

In the present embodiment, the above mounting method enables reduction of the manufacturing cost and weight and achievement of satisfactory performance of the bushing.

Next, the operation of the lower arm 12 is explained. For example, when a wheel of the vehicle travels on a rough road surface and runs on a step, vibrations from the road, the push-up load, and forces in the front-rear direction of the vehicle are exerted on the wheel. In addition, when the vehicle slows down, the wheel receives a braking force and therefore a force in the front-rear direction of the vehicle is exerted on the wheel. The vibrations from the road, the push-up load, and forces in the front-rear direction of the vehicle cause the lower arm 12 to swing around the axial line L (as illustrated in FIG. 1), so that the wheel pitches in the vertical direction with respect to the vehicle body, and is displaced in the front-rear direction of the vehicle. In addition, rolling during cornering of the vehicle and the like causes the lower arm 12 to swing around the axial line L.

The vibrations, the push-up load, and the forces in the front-rear direction of the vehicle are exerted on the front bush 24 arranged in the front attachment portion 18 on the arm body 14 and the rear bush 42 arranged in the rear attachment portion 20.

In the front bush 24, the shaft (not shown) fixed to the vehicle body side causes elastic deformation of the rubber elastic element 38, so that the vibrations, the push-up load, and the forces in the front-rear direction of the vehicle are absorbed (buffered). On the other hand, in the rear bush 42, the shaft portion 16 arranged at the rear end portion (in the front-rear direction of the vehicle) of the arm body 14 causes elastic deformation of the rubber elastic element 46 (into which the shaft portion 16 is fitted or press fitted), so that the vibrations, the push-up load, and the forces in the front-rear direction are absorbed (buffered).

As explained above, the energy of the vibrations, the push-up load, and the forces in the front-rear direction of the vehicle is absorbed by the elastic deformation of the rubber elastic element 38 in the front bush 24 and the rubber elastic element 46 in the rear bush 42. As a result, the vibrations, the push-up load, and the forces in the front-rear direction of the vehicle are buffered, so that the ride comfort is improved.

Figure 12A:
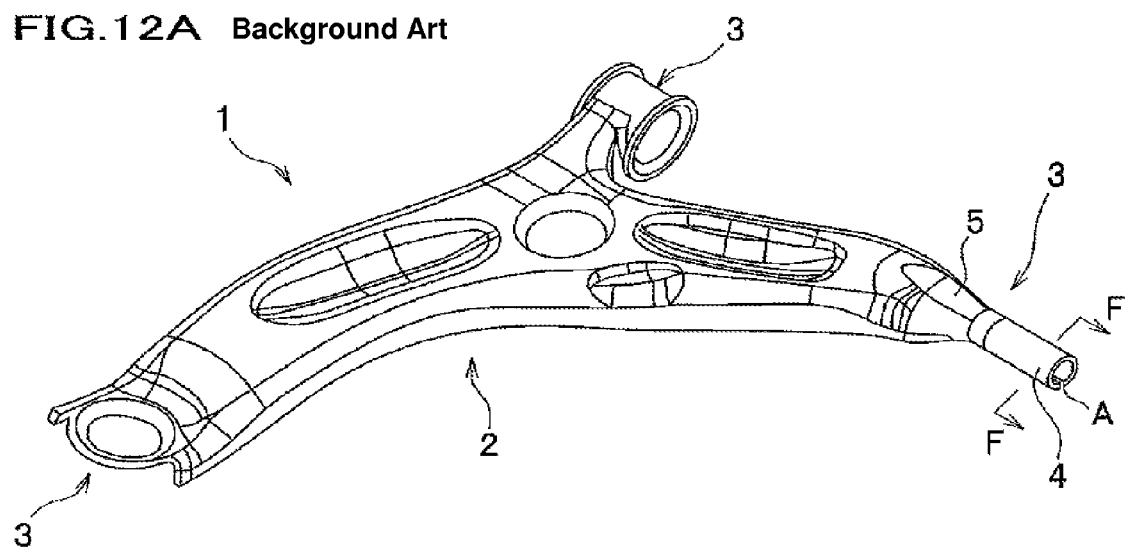
FIG. 12A is a perspective diagram of the control arm according to the conventional technique.
Figure 12B:
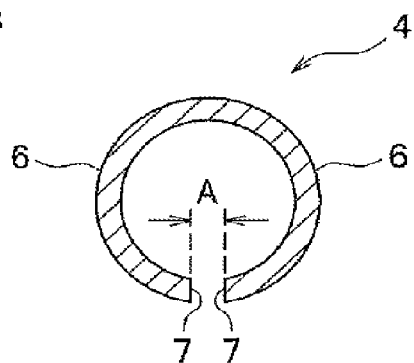
FIG. 12B is a vertical cross-sectional view at the F-F cross section indicated in FIG. 12A.
Figure 12C:
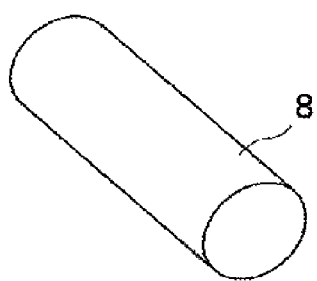
FIG. 12C is a perspective diagram of the bearing member.

In the present embodiment, the biased portion 52 is provided, so that the opposite edge faces 50a and 50b of the portion of the plate-like member 59 of which the shaft portion 16 having a tubular shape or a closed cross section is formed are caused be biased to abut and press each other. Therefore, for example, the operations for adhesion or welding between the opposite edge faces 50a and 50b can be dispensed with, so that the rigidity of the shaft portion 16 can be increased. In addition, since the opposite edge faces 50a and 50b are butted and are mutually biased, it is possible to suppress slippage of the abutting portions of the opposite edge faces 50a and 50b when the shaft portion 16 receives a force from the wheel. Further, the arrangement of the cylindrical bearing member 8 (as illustrated in FIG. 12C) inside the bearing journal 4 as in the conventional technique becomes unnecessary, so that it is possible to achieve weight reduction while securing predetermined rigidity and strength.

Resultantly, according to the present embodiment, it is possible to simplify the manufacturing process, reduce the manufacturing cost, and achieve weight reduction. Further, according to the present embodiment, the predetermined rigidity and strength can be achieved, and the various conditions including the manufacturing cost, the weight reduction, the operational simplification, and the rigidity and strength can be concurrently achieved in harmony with each other.

In addition, according to the present embodiment, the shaft portion 16 is formed by use of the reverse flange portions 14c, which contribute to improvement in the rigidity of the arm body 14, as illustrated in FIGS. 6A and 6B. Therefore, it is possible to continuously form closed cross sections in the portion between the arm body 14 and the shaft portion 16, and secure the rigidity (in the transition portion) between the arm body 14 and the shaft portion 16.

Further, according to the present embodiment, the edge faces 50a and 50b of the reverse flange portions 14c gradually come closer to each other with approach to the shaft portion 16 from the arm body 14, and the edge faces 50a and 50b abut and bias each other in the shaft portion 16, as illustrated in FIG. 6A. Therefore, it is possible to avoid occurrence of intense stress concentration between the arm body 14 and the shaft portion 16, and improve the rigidity and strength.

Furthermore, according to the present embodiment, the clearance 58 is arranged between the recessed portion 54 and the protruding portion 56 in the arrangement in which the opposite edge faces 50a and 50b of the plate-like member 59 are butted, and the recessed portion 54 and the protruding portion 56 are fitted to each other through the clearance 58, as illustrated in FIG. 6B. Therefore, when the plate-like member 59 is bent to butt the opposite edge faces 50a and 50b, for example, it is possible to suppress occurrence of a non-abutting state of the opposite edge faces 50a and 50b of the portion of the plate-like member 59 of which the shaft portion 16 is formed. In addition, it is possible to improve the accuracy in forming the shaft portion 16. Such a non-abutting state occurs, for example, when a dimensional error (a manufacturing tolerance) or the like causes a situation in which the protrusion in the protruding portion 56 exceeds a predetermined amount or the recession in the recessed portion 54 is small.

Moreover, according to the present embodiment, the recessed portion 54 and the protruding portion 56 are fitted to each other as illustrated in FIG. 6A. Therefore, it is possible to prevent slippage of the opposite edge faces 50a and 50b in the axial direction with high reliability when a force is transferred from the wheel.

In addition, according to the present embodiment, the shaft portion 16 of the arm body 14 being formed of the plate-like member 59 and having a closed cross section enables direct elastic support of the rubber elastic element 46 (elastic member) in the rear bush 42. Therefore, the arrangement of the axial direction of the rubber elastic element 46 along the swing axis of the lower arm 12 (the axial line L), which is in the front-rear direction of the vehicle, enables dispensing with the shaft for supporting the elastic member, reducing the manufacturing cost, and achieving the weight reduction of the lower arm 12.

Further, according to the present embodiment, the shaft portion 16 is fitted or press fitted into the through-hole 48 of the rubber elastic element 46 in such a direction that the shaft portion 16 twists the rubber elastic element 46 (as indicated by the arrows and the two-dot chain line in FIG. 4B). Therefore, the rubber bush is not deformed in the twist direction, so that it is possible to achieve satisfactory bushing characteristics.

Furthermore, according to the present embodiment, the biased portion 52 is arranged on the vertically lower one (in the vertical direction of the vehicle) of the sides of the shaft portion 16 which is formed to have the rectangular cross section. (See FIG. 6A.) Therefore, according to the present embodiment, it is possible to prevent opening of the biased portion 52 or slippage in the axial direction, since only forces in the direction of closing the biased portion 52 are applied to the biased portion 52, for example, even when forces in the lateral direction (lateral force) are transferred from the wheel side. Resultantly, according to the present embodiment, it is possible to improve the strength and rigidity of the shaft portion 16, and prevent production of abnormal noise which can be produced from the contact of the abutting opposite edge faces 50a and 50b of the plate-like member 59.

Moreover, according to the present embodiment, the shaft portion 16 is formed of the plate-like member 59 (of which the arm body 14 is formed) to have a rectangular cross section (with four corners) perpendicular to the axial direction of the shaft portion 16, and the through-hole 48 in the rubber elastic element 46 is formed in such a manner that the cross section perpendicular to the axial direction of the through-hole 48 has a shape corresponding to the rectangular shape of the shaft portion 16. Therefore, manufacturing is easy and the manufacturing cost can be low, for example, compared with the case in which the shaft portion 16 has a round cross section.

In addition, according to the present embodiment, both of the front attachment portion 18 and the rear attachment portion 20, which are attached to the vehicle body side, can be arranged integrally with the arm body 14. Therefore, for example, it is unnecessary to separately provide a member for attaching the shaft portion 16 to the through-hole 48. Thus, the number of parts and the manufacturing cost can be reduced. Further, since welding of the member for attaching and the like is unnecessary, so that the cost of the welding can be saved, and the total weight of the lower arm 12 can be reduced. Furthermore, the unnecessariness of the welding simplifies the manufacturing process, so that the manufacturing cost can be reduced.

Further, the above explanations on the present embodiment are based on the shaft portion 16 which extends from the arm body 14 to the rear end in the front-rear direction of the vehicle. However, it is possible to arrange a shaft portion 16d which extends from the arm body 14 to the vehicle body side in the vehicle width direction as in the lower arm 12a according to another embodiment illustrated in FIG. 11. A rubber elastic element 46 is fitted or press fitted onto the shaft portion 16d. The bracket which is attached on the vehicle body side and onto which the rubber elastic element 46 is to be fitted is not illustrated in FIG. 11.

LIST OF REFERENCE SIGNS

10: Suspension 12, 12a: Lower Arm (Suspension Arm)
14: Arm Body
14a: Horizontal Portion
14b: Vertical Portion
14c: Reverse Flange Portion
16, 16a to 16d: Shaft Portion
46: Rubber Elastic Element (Elastic Member)
50a, 50b: Opposite Edge Faces (Opposite Edge Portions)
52: Biased Portion
54: Recessed Portion
56: Protruding Portion
58: Clearance
59: Plate-like Member
L: Axis (Swing Axis)

The invention claimed is:

1. A suspension arm mounting structure for mounting a suspension arm which swingably supports a wheel side of a vehicle from a side of a vehicle body, including:
   a suspension arm formed of a plate-like member; and
   an elastic member arranged between the suspension arm and the side of the vehicle body,
   wherein the plate-like member includes:
   a horizontal portion which extends in an approximately horizontal direction when the suspension arm is mounted on the vehicle body;
   vertical portions which are bent downward from edge portions of the horizontal portion; and
   reverse flange portions which are bent inward from lower edge portions of the vertical portions,
   wherein edges of the reverse flange portions form opposite edges of the plate-like member which are facing each other,
   wherein the suspension arm includes:
   an arm body arranged between the wheel side and the vehicle body side; and
   a shaft portion which extends from the arm body in a front-rear direction of the vehicle or a width direction of the vehicle, has a tubular shape or a closed cross section, and is fitted or press fitted into an inner circumference of the elastic member, wherein the shaft portion includes a biased portion in which the opposite edges of the plate-like member are biased such that the opposite edges abut and press each other, and wherein the opposite edges of the plate-like member gradually come closer to each other with approach to the shaft portion from the arm body, and abut and bias each other in the shaft portion.

2. The suspension arm mounting structure according to claim 1, wherein a recessed portion is formed in one of the opposite edges of the plate-like member which are opposed and butted, a protruding portion is formed in another of the opposite edges of the plate-like member, and the recessed portion and the protruding portion are fitted to each other with a clearance therebetween.

3. A suspension arm mounting structure for mounting a suspension arm which swingably supports a wheel side of a vehicle from a side of a vehicle body, including:

a suspension arm formed of a plate-like member; and an elastic member arranged between the suspension arm and the side of the vehicle body, wherein the plate-like member includes:

a horizontal portion which extends in an approximately horizontal direction when the suspension arm is mounted on the vehicle body;

vertical portions which are bent downward from edge portions of the horizontal portion; and reverse flange portions which are bent inward from lower edge portions of the vertical portions, wherein edges of the reverse flange portions form opposite edges of the plate-like member which are facing each other, wherein the suspension arm includes:

an arm body arranged between the wheel side and the vehicle body side; and a shaft portion which extends from the arm body in a front-rear direction of the vehicle, has a tubular shape or a closed cross section, and is fitted or press fitted into an inner circumference of the elastic member, wherein the shaft portion includes a biased portion in which the opposite edges of the plate-like member are biased such that the opposite edges of the plate-like member abut and press each other in a common approximately horizontal plane in the biased portion when the suspension arm is mounted on the vehicle body, and wherein the opposite edges of the plate-like member gradually come closer to each other with approach to the shaft portion from the arm body, and abut and bias each other in the shaft portion.

4. The suspension arm mounting structure according to claim 3, wherein a recessed portion is formed in one of the opposite edges of the plate-like member which are opposed and butted, a protruding portion is formed in another of the opposite edges of the plate-like member, and the recessed portion and the protruding portion are fitted to each other with a clearance therebetween.

* * * * *